United States Patent
Uchida et al.

[15] 3,644,842
[45] Feb. 22, 1972

[54] OPTICAL HIGHER HARMONIC GENERATOR WITH TEMPERATURE EFFECTING PHASE MATCHING

[72] Inventors: Teiji Uchida; Shogo Yoshikawa; Atsufumi Ueki, all of Tokyo, Japan

[73] Assignee: Nippon Electric Company, Limited, Tokyo, Japan

[22] Filed: July 22, 1969

[21] Appl. No.: 843,564

[30] Foreign Application Priority Data
July 23, 1968 Japan......................................43/52375

[52] U.S. Cl. ............................................................331/94.5
[51] Int. Cl. ................................................................H01s 3/00
[58] Field of Search.............................................331/94.5

[56] References Cited

UNITED STATES PATENTS

| | | | |
|---|---|---|---|
| 3,412,251 | 11/1968 | Hargrove | 331/94.5 |
| 3,387,204 | 6/1968 | Ashkin et al. | 331/94.5 |
| 3,409,819 | 11/1968 | Soffer | 331/94.5 |
| 3,405,370 | 10/1968 | Kaminow | 331/94.5 |
| 3,407,309 | 10/1968 | Miller | 331/94.5 |
| 3,444,479 | 5/1969 | Harris et al. | 331/94.5 |

*Primary Examiner*—Ronald L. Wibert
*Assistant Examiner*—V. P. McGraw
*Attorney*—Sandoe, Hopgood and Calimafde

[57] ABSTRACT

An optical higher harmonic generator includes a laser material, an excitation source for producing the population inversion in the laser material, and two reflectors constituting an optical resonator sandwiching the laser material therebetween. A crystal piece having the electro-optical effect and nonlinear optical effect is disposed within the resonator and a signal source applies to the crystal piece a signal having the modulation frequency and voltage necessary for locking the oscillation modes of the laser.

2 Claims, 1 Drawing Figure

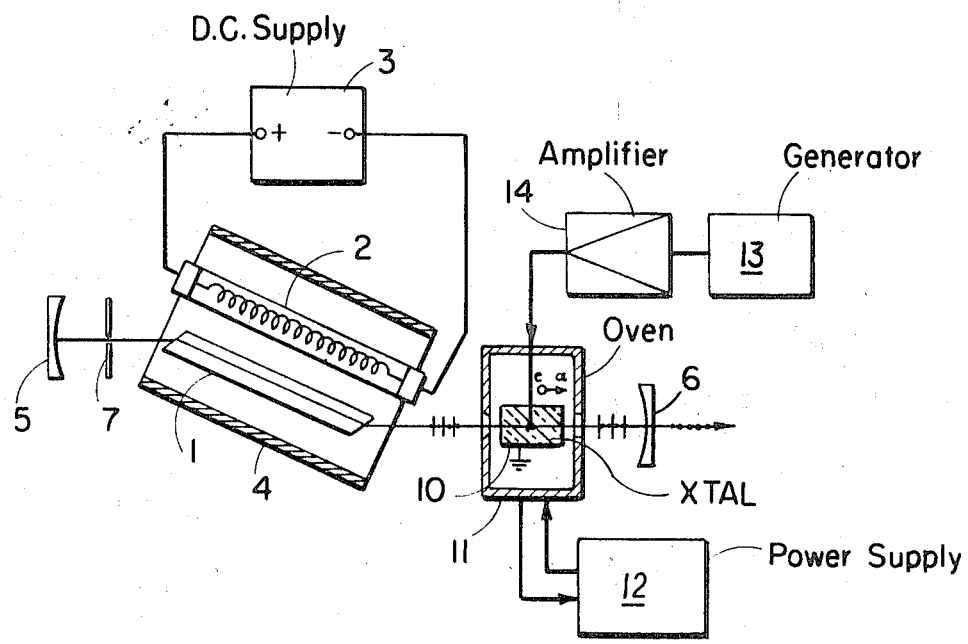

OPTICAL HIGHER HARMONIC GENERATOR WITH TEMPERATURE EFFECTING PHASE MATCHING

This invention relates to a higher harmonic generator using laser light rays and, more particularly, to such a higher harmonic generator of an ultra-high-speed light pulse train as includes a harmonic generating element disposed within the laser resonator.

BACKGROUND OF THE INVENTION

It has been the common practice in the generation of higher harmonics using laser light for the laser output beam to be collimated into an optically nonlinear crystal piece disposed outside of the laser resonator. However, this type of structure is not sufficiently effective, because its harmonic conversion efficiency is low. To improve the efficiency, several proposals have been made. One of them is based on the fact that the output of the mode-locked laser is pulsive and that the conversion efficiency at the pulse peak is high. Another proposal employs an optically nonlinear crystal piece disposed within the laser resonator so that the high-intensity fundamental laser oscillation within the optical resonator may be directly concentrated onto the crystal piece. It is true that these measures have contributed to improve the harmonic conversion efficiency; however, it is still difficult to put those systems into practical use because of the high excitation power needed for the laser material.

OBJECTS OF THE INVENTION

The object of the present invention is, therefore, to provide an optical higher harmonic generator having high efficiency even for low excitation power.

Another object of the present invention is to provide an optical higher harmonic generator for generating a higher harmonic light pulse train of ultra-high-speed and narrow width.

BRIEF SUMMARY OF THE INVENTION

According to the present invention, there is provided an optical higher harmonic generator comprising a laser material, an excitation source for producing the population inversion in the laser material, two reflecting mirrors constituting an optical resonator with the laser material disposed therebetween, a nonlinear, electro-optic crystal piece inserted between one of the mirrors and the laser material, and a mode-locking signal source for applying to the crystal piece a modulation signal for locking the oscillation modes of the laser.

The excitation energy source supplies energy to excite the laser material and produce the population inversion between the energy levels associated with laser transition. As is well known, owing to this population inversion, the laser material brings about gain for the light beam at the laser transition frequency. Thus, laser oscillation is produced with the help of two mirrors disposed on both sides of the laser material to form an optical resonator. Since the insertion of an optically nonlinear crystal piece admits the utilization of a strong oscillating electric field in the laser resonator, as is described in an article by R. G. Smith et al. in "Applied Physics Letters," Vol. 7, No. 10, Nov. 15, 1965) pp. 256-8, the mere disposition of the crystal piece inside of the resonator gives a conversion efficiency considerably higher than that of the conventional harmonic generation of the external irradiation type.

Moreover, since a mode-locking modulating signal, in the present invention, of a frequency approximately equal to the mode frequency interval determined by the length of the optical resonator is applied from the signal source to a crystal having the nonlinear optical effect and the electro-optical effect, the oscillating light beam within the laser is modulated by this applied voltage. Depending upon the relation between the crystal axis and the axis of the optical resonator, the modulation may be either frequency modulation or amplitude modulation. The former is described in an article by E. O. Ammann et al., "IEEE Journal of Quantum Electronics," Vol. QE-1, No. 11 (November, 1965), pp. 263-272, and the latter is described in an article by the present inventors in the "IEEE Journal of Quantum Electronics," Vol. QE-3, No. 1 (January, 1967), pp. 17-30. If this applied voltage is greater than a threshold value, the mode-locking phenomenon occurs, under which condition the laser output becomes a train of regularly spaced narrow-width pulses of a repetition frequency equal to the mode-locking modulation frequency. The generated light pulse is reciprocated between two reflectors constituting the resonator. In the aforementioned mode-locked oscillation, the peak value of the light pulse within the resonator is much greater than the electric field intensity of the internal oscillation obtainable by a mode-unlocked oscillator of equal power consumption. Since the harmonic conversion efficiency of the optically nonlinear crystal is in proportion to the second power of the intensity of the laser beam, this increase in the pulse peak intensity brings about a high conversion output. In their paper published in "Applied Physics Letters," Apr. 1, 1966 issue, pp. 180-183, M. DiDomenico, Jr. et al. report that the increase in the higher harmonic output is realizable by making the fundamental laser light pulsive resorting to the mode-locking phenomenon. It is to be noted, however, in their experiment that the harmonic generation is performed outside of the laser resonator using the mode-locked laser output pulse. Also, since an additional internal modulator for the mode-locking is not needed within the optical resonator, the increase of the internal loss of the resonator due to the insertion of the internal modulator and the consequent decrease in the harmonic conversion efficiency, are obviated in the present invention, making it possible to attain one of the objects of the present invention, the realization of the optical harmonic generator of high conversion efficiency. Also, since the light pulse is reciprocated between the paired reflecting mirrors of the optical resonator due to the mode-locking phenomenon, the higher harmonic light wave has the regularly spaced pulses of its repetition frequency equal to the fundamental pulse train. Also, because of the second power-dependent characteristics of the harmonic converter, the harmonic pulse width tends to be narrower than that of the fundamental frequency pulse. Thus, another object of the present invention, i.e., the generation of the ultra-high-speed narrow optical harmonic pulse is achieved.

The above mentioned and other features and objects of this invention and the manner of attaining them will become more apparent and the invention itself will best be understood by reference to the following description of an embodiment of the invention taken in conjunction with the accompanying drawing, the description of which follows, wherein the FIGURE schematically shows an embodiment of the present invention.

DETAILED DESCRIPTION OF THE INVENTION

Referring now to the drawing, the preferred embodiment of the invention comprises a YAG (yttrium aluminum garnet) rod 1 including trivalent neodymium ion ($Nd^{3+}$) disposed on one of the two axes of foci of the elliptic-cylinder-shaped reflector 4. On the other focal axis, a tungsten lamp 2 is disposed which is energized by the direct-current power supply 3. The light rays emanating from the lamp 2 are concentrated onto the YAG laser rod 1, partly after being reflected by the reflector 4. By this irradiation, the population inversion is produced between the laser levels $^4F_{3/2}$ and $^4F_{11/2}$ of neodymium ions. Since both end surfaces of the laser rod 1 are polished to form the so-called Brewster's angle with respect to the axis of rod 1, the laser oscillation at the wavelength of 1.06 micron is linearly polarized. Needless to say, the axis of the resonator formed by two concave reflecting mirrors 5 and 6 disposed at both ends of the rod 1 is in alignment with the axis of the rod 1. In the drawing, the polarized laser beam has the electric field in the plane of the drawing. (In the following, this polarization is referred to as polarization parallel with the plane of the sheet of the drawing.) The reflectivity of the reflecting mirrors 5 and 6 is highest at the wavelength of the fundamental wave (1.06 micron) so as to strengthen the intensity of the oscillation. In addition, at least one of the mirrors should have high transmissivity for higher harmonics (0.53 micron) to derive the generated higher harmonics. The iris 7 is inserted to suppress all the modes of laser oscillation other than the fundamental transverse mode. A crystal piece 10 of lithium niobate ($L_iN_bO_3$) is inserted in the resonator as is shown in the drawing, with its $a$ axis oriented in parallel with the optical axis of the resonator and with $c$ axis normal to the polarization direction of the laser output. With this orientation, the crystal piece 10 has the ordinary refractive index of approximately 2.236 for the laser light rays (1.06 micron) while, as to the higher harmonics (0.53 micron), the extraordinary refractive index is approximately 2.232 at room temperature. At a higher temperature around 40° C., the above-mentioned refractive indices are made equal. With this so-called phase matching condition fulfilled, the efficient generation of the higher harmonics is realized. The temperature oven 11 is controlled by the power supply 12 and maintains the temperature of the crystal piece 10 to fulfill the condition of the phase matching.

A mode-locking signal from the signal source 13 is amplified by the amplifier 14 and then applied to the electrodes attached to the crystal piece 10 at the $c$ planes (two surfaces normal to the $c$ axis). The frequency of the signal is selected approximately equal to $c/2L$, where L is the optical length of the resonator and $c$ is light velocity. With the electric field applied in the $c$-axis direction, the refractive index $n_o$ of the crystal piece 10 for the light polarized in the direction normal to the $c$ axis is changed by an amount $-(½)r_{23}n_o^3E$ ($r_{23}$ equals one of the electro-optical constants). As a result, the laser light is subjected to frequency modulation by the mode-locking signal voltage. If the applied mode-locking signal voltage is of the order above 10 volts RMS, the mode-locking phenomenon is observed, with the consequence that the laser produces a train of sharp pulses. Owing to this pulsive oscillation, the efficiency of the higher harmonic generation is raised to make the higher harmonic output also pulsive. In order to reduce the loss, an antireflection coating may be applied on the $a$ planes (input and output surfaces) of the crystal piece 10.

While the principles of the invention have been described in connection with specific apparatus, it is to be clearly understood that this description is made only by way of example and not as a limitation to the scope of the invention. For example, in this embodiment, one end surface of the YAG laser rod may be polished perpendicularly to the optical axis, with the antireflection coating thereon. Moreover, both end surfaces may be perpendicular to the optical axis, if the oscillation in linear polarization is assured by, for example, an optical flat plate inserted within the resonator. Since the tungsten lamp 2 is only for exciting the laser rod 1, any other kind of lamp, such as an argon-arc lamp, or a luminous diode, may be used. Also, the reflecting cylindrical reflector 4 may be replaced by spherical or spheroidal reflectors adapted to concentrate the excitation light rays onto the laser rod 1. One of the reflecting mirrors 5 and 6 may be flat or convex instead of concave. Alternatively, the reflecting mirror 5 may be formed by evaporation on the end surface of the laser rod after being polished perpendicularly to its optical axis. The iris 7 may be dispensed with when the thickness of the rod 1 and the configuration of the resonator are suitable. The crystal piece 10 may be replaced with any other similar crystals such as barium-sodium niobate ($Ba_2NaNb_5O_{15}$), which have the optical nonlinearity and the electro-optical effect. The orientation of the $a$ and $c$ axes is not limited to the above-mentioned examples. Further, the modulation for mode-locking is not limited to frequency modulation. Amplitude modulation may be adopted by rotating the crystal piece 10 about its $a$ axis by 45° so as to convert a portion of the electric field of the laser beam normal to the $c$ axis into higher harmonics. In this modification, however, the temperature of the crystal should be finely controlled in order to prevent the loss possibly produced even under the no modulation condition. Instead of the antireflection coating, prisms may be attached to the crystal piece 10 at both of its ends to form a Brewster's angle, which is made of material having the refractive index approximately equal to that of the crystal 10.

The modulation frequency for mode-locking is not restricted to $c/2L$. It may be an integral multiple of $c/2L$. Furthermore, the laser rod 1 may be made of any other kind of crystal or glass capable of forming a laser rod, and the neodymium ions forming the laser-active material may be any other activable substances such as rare earth elements. If desired, a gas or liquid laser can be substituted for the solid-state material. The laser-active material may be excited not by the irradiation light source optically, but by a DC power source electrically. Depending on the wavelength of the laser oscillation, the crystal piece 10 should be suitably selected. Phase matching may be realized not only by temperature control but also by applying a bias voltage. The condition of the phase matching must be taken into consideration exactly as to the instantaneous refractive index observed at the instant when the light pulse within the mode-locked laser passes through the crystal piece 10 (the refractive index continuously varies in response to the modulating voltage). Therefore, although the condition of the phase matching is slightly different from that corresponding to zero modulating voltage, the adverse effect is practically almost negligible.

What is claimed is:

1. An optical higher harmonic generator comprising: a laser material; an excitation source for producing a population inversion in said laser material; two reflectors disposed on either side of said laser material for constituting an optical resonator having an optical axis; a crystal piece having the electro-optical effect and nonlinear optical effect disposed within said resonator, said crystal piece being selected from the group consisting of lithium niobate and barium-sodium niobate, said crystal piece having an $a$ axis parallel with said resonator optical axis and a $c$ axis normal to the polarization direction of the laser output; a signal source for applying to said crystal piece a signal having the modulation frequency and voltage necessary for locking the oscillation modes of the laser, and means for controlling and maintaining the temperature of said crystal piece for effecting phase matching such that optical higher harmonics of the laser output are generated.

2. The higher harmonic generator claimed in claim 1, wherein one of said reflectors is made from material having a high transmissivity at the desired higher harmonic.

* * * * *